(12) United States Patent
Willets et al.

(10) Patent No.: US 7,615,877 B2
(45) Date of Patent: *Nov. 10, 2009

(54) POWER GENERATION SYSTEM FOR MOBILE POWER SUPPLY

(75) Inventors: Julie A. Willets, Overland Park, KS (US); Larry L. Johnson, Overland Park, KS (US); Jerry D. Meyers, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 263 days.

This patent is subject to a terminal disclaimer.

(21) Appl. No.: 11/744,038

(22) Filed: May 3, 2007

(65) Prior Publication Data

US 2007/0200533 A1 Aug. 30, 2007

Related U.S. Application Data

(60) Division of application No. 11/214,133, filed on Aug. 29, 2005, now Pat. No. 7,245,032, and a continuation-in-part of application No. 10/298,074, filed on Nov. 15, 2002, now Pat. No. 6,960,838, and a continuation-in-part of application No. 11/123,548, filed on May 5, 2005, now Pat. No. 7,112,891, and a continuation-in-part of application No. 10/439,204, filed on May 15, 2003, now Pat. No. 6,930,402.

(51) Int. Cl.
*H02P 9/04* (2006.01)

(52) U.S. Cl. .............................. 290/1 A; 290/2; 290/52; 307/64

(58) Field of Classification Search .................. 290/1 R, 290/1 A, 2, 52, 51; 322/7, 8; 307/64
See application file for complete search history.

(56) References Cited

U.S. PATENT DOCUMENTS

| | | | | |
|---|---|---|---|---|
| 5,625,276 A * | 4/1997 | Scott et al. | | 322/24 |
| 6,649,289 B2 * | 11/2003 | Hsu et al. | | 429/13 |
| 6,841,893 B2 * | 1/2005 | Maiwald et al. | | 290/43 |
| 6,879,052 B1 * | 4/2005 | Johnson | | 290/1 A |
| 6,885,112 B2 * | 4/2005 | Johnson | | 290/1 A |
| 6,930,402 B1 * | 8/2005 | Johnson et al. | | 290/1 R |
| 6,960,838 B2 * | 11/2005 | Johnson | | 290/1 A |
| 6,992,401 B1 * | 1/2006 | Johnson | | 290/1 A |
| 7,081,687 B2 * | 7/2006 | Johnson | | 290/1 A |
| 7,098,548 B2 * | 8/2006 | Johnson | | 290/1 A |
| 7,112,891 B2 * | 9/2006 | Johnson et al. | | 290/1 A |
| 7,157,803 B2 * | 1/2007 | Meyers et al. | | 290/1 A |
| 7,240,492 B2 * | 7/2007 | Johnson | | 60/649 |
| 7,242,104 B1 * | 7/2007 | Johnson | | 290/1 A |
| 7,245,032 B2 * | 7/2007 | Willets et al. | | 290/1 A |
| 7,245,034 B2 * | 7/2007 | Johnson | | 290/1 A |
| 7,256,506 B2 * | 8/2007 | Johnson | | 290/1 A |
| 7,298,053 B2 * | 11/2007 | Johnson et al. | | 290/1 A |
| 7,352,578 B2 * | 4/2008 | Willets et al. | | 361/700 |
| 7,370,666 B2 * | 5/2008 | Willets et al. | | 137/487.5 |
| 7,394,168 B1 * | 7/2008 | Johnson | | 307/45 |
| 7,405,488 B2 * | 7/2008 | Suso | | 290/1 A |
| 7,436,079 B2 * | 10/2008 | Meyers et al. | | 290/1 A |
| 7,456,513 B2 * | 11/2008 | Meyers et al. | | 290/54 |
| 2004/0094963 A1 * | 5/2004 | Johnson | | 290/2 |
| 2006/0038533 A1 * | 2/2006 | Johnson et al. | | 320/107 |

* cited by examiner

*Primary Examiner*—Nicholas Ponomarenko

(57) ABSTRACT

The present invention is a mobile-energy generating system capable of providing redundant direct current power. It comprises a reciprocating engine and generator having dual fuel capability, a fuel cell, commercial electrical power hookups, and capacitors used for bridging purposes. Back-up fuel for the engine and fuel for the fuel cells are stored in propane and hydrogen storage tanks, respectively.

8 Claims, 3 Drawing Sheets

POWER GENERATION SYSTEM FOR MOBILE POWER SUPPLY

CROSS-REFERENCE TO RELATED APPLICATIONS

This application is a division of and claims priority to U.S. patent application Ser. No. 11/214,133, filed Aug. 29, 2005 which is a continuation-in-part of and claims priority to U.S. patent application Ser. No. 10/298,074 filed Nov. 15, 2002, and is also a continuation-in-part of and claims priority to U.S. patent application Ser. No. 11/123,548 filed May 5, 2005 which is a continuation-in-part of and claims priority to U.S. patent application Ser. No. 10/439,204 filed May 15, 2003.

STATEMENT REGARDING FEDERALLY SPONSORED RESEARCH OR DEVELOPMENT

None.

BACKGROUND

Traditionally, commercial power from a utility has been used as the primary source of electrical power for a consuming entity, e.g., a telecommunications facility. Many power systems include backup power sources to deliver power in the event the utility is unable to deliver power. Black-outs and other disturbances in the commercial power grid make this necessary. To provide back-up, many facilities use a diesel generator, which is then backed up by an array of batteries.

Conventionally, all of these systems—the commercial AC receiving equipment, the diesel generator, and the batteries—are all physically installed around or in the facility. The installation process drains engineering time because it typically involves customizing the equipment to meet the needs of the facility.

Operationally, if power from the commercial utility is lost, the diesel generator is activated to supply power to the facility. It takes time for the diesel generator to come online, though. Because of this, the battery array provides power during the time it takes to switch from the utility source to the diesel-generated source. If the generator also fails (e.g., runs out of fuel, suffers a mechanical failure), then the battery array is able to provide power for an additional, but limited, period of time.

SUMMARY

The present invention encompasses a power system which overcomes faults present in conventional arrangements. The system includes a dual fuel capable reciprocating engine and generator fueled by natural gas from a commercial gas-utility company or alternatively from one or more standby propane gas tanks. The engine driven generator is used as the primary power source for the facility. In the event of natural gas or propane supply problems, or engine failure, the system draws power from an AC utility. In the event of failure of the AC power grid, a hydrogen-powered fuel cell delivers backup power.

In the event there is a sudden temporary drop in power, e.g., when a switch is made between power-generating sources, an array of super capacitors will be used to bridge the downtime until one of the power generators is brought online.

BRIEF DESCRIPTION OF THE DRAWINGS

The present invention is described in detail below with reference to the attached drawing figures, wherein.

DETAILED DESCRIPTION

The present invention is entirely mobile. This makes it ideal for serving power consumers in remote locations. The main source of generating power is a reciprocating engine coupled to a generator. The engine uses natural gas as its primary source of energy and propane as its secondary source of energy. This eliminates dependence on utility-purchased AC. Utility AC is only used if the engine fails (e.g., natural gas or propane is unavailable or some mechanical malfunction has occurred). If commercial AC is not available, the system uses a fuel cell to generate DC power. The fuel cell runs on hydrogen, which is stored in tanks.

Figure 1:
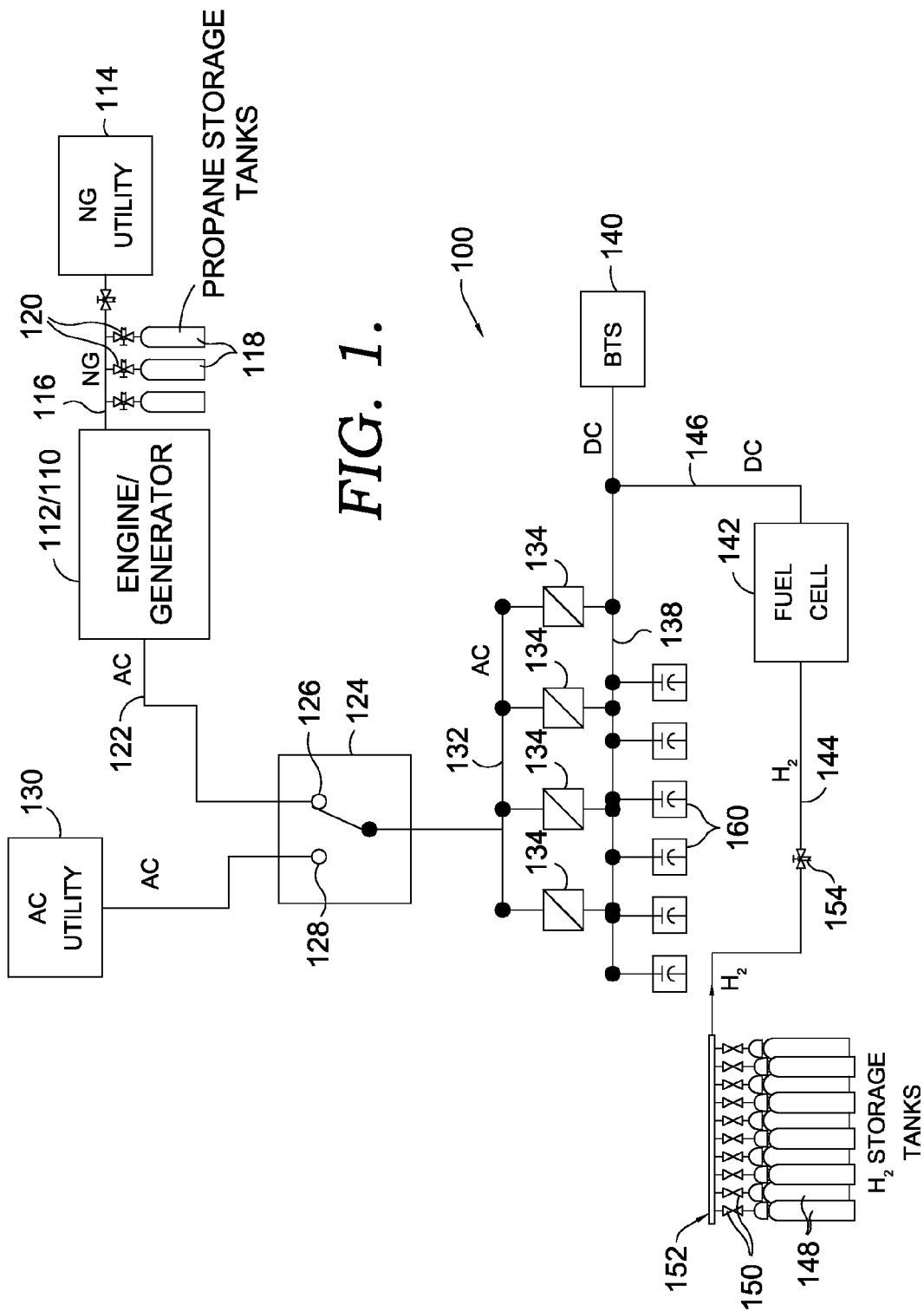
FIG. 1 is a schematic diagram showing one embodiment of the system of the present invention.
Figure 2:
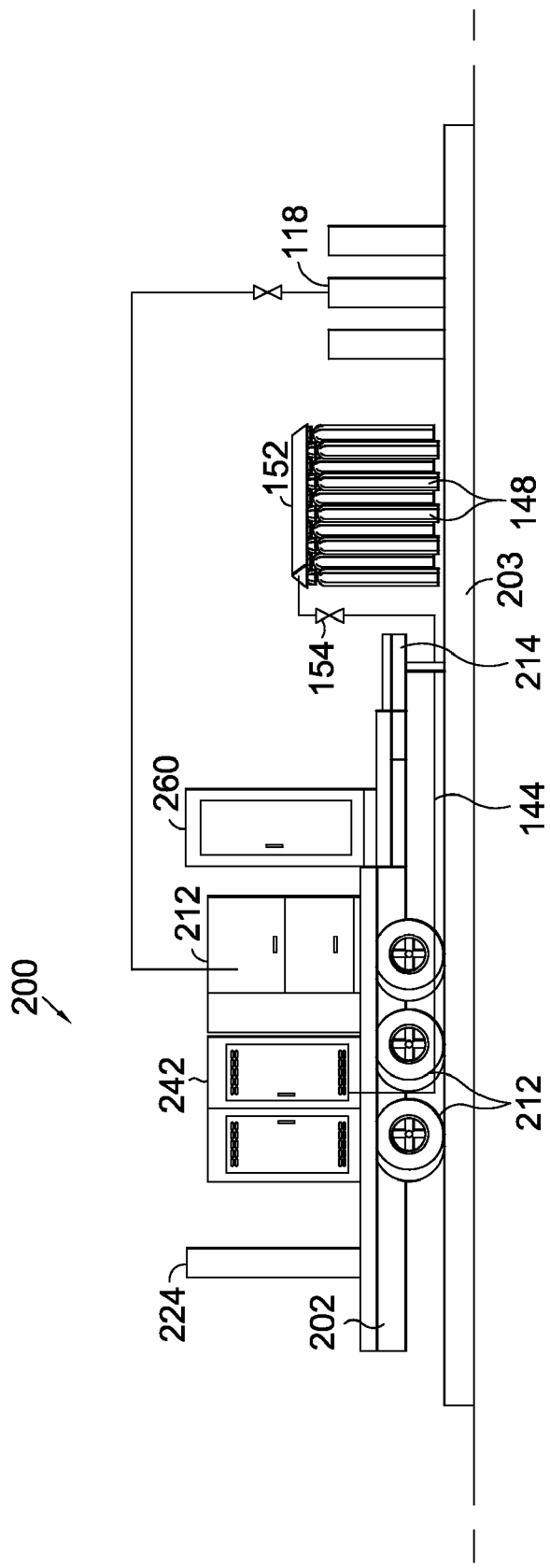
FIG. 2 depicts the mobility aspects of the devices of the present invention showing the trailer and other associated components.
Figure 3:
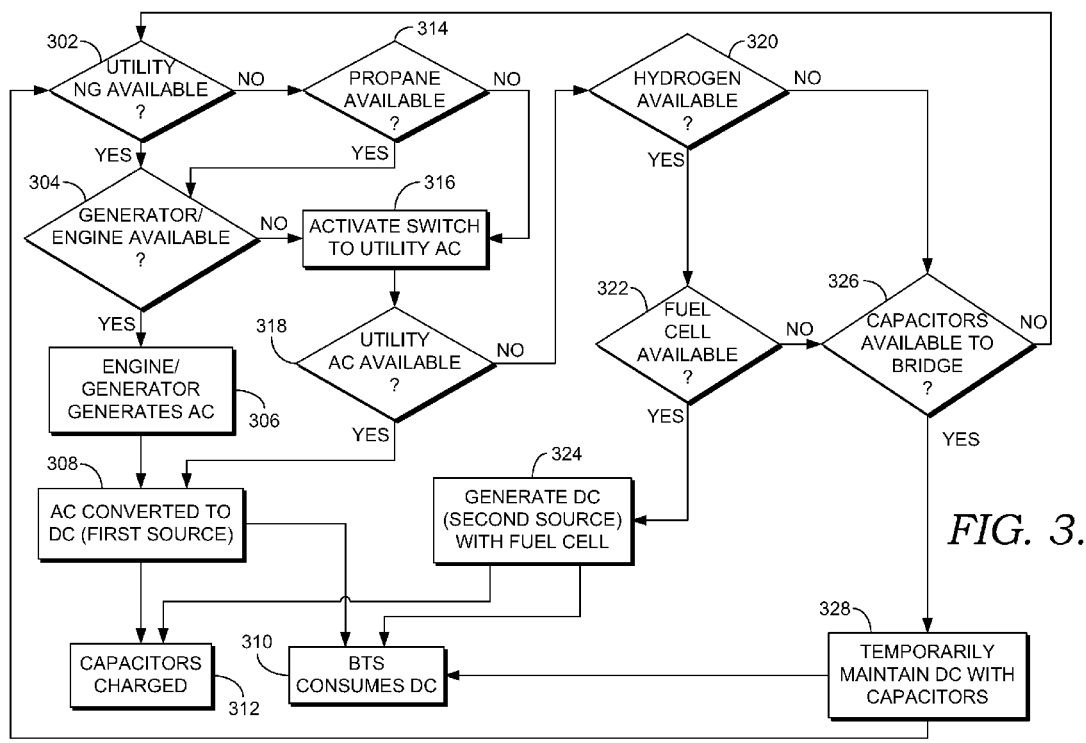
FIG. 3 is a flow diagram showing the backup-power-management system of the present invention.

The present invention is best understood in connection with (i) the schematic diagram of FIG. 1, (ii) the drawing of the physical embodiments in FIG. 2, and (iii) the flow chart of FIG. 3.

Referring to FIG. 1, the schematic diagram shows one embodiment for a novel power system 100 that is capable of producing redundant direct current (DC) power. System 100 comprises a generator 110 including a reciprocating engine 112, where generator 110 produces a first source of alternating current (AC). As one skilled in the art of electrical generation will understand, this first source of AC is produced as a result of the shaft power from reciprocating engine 112 turning a coil in a magnetic field of generator 110. For the purposes of this application, a reciprocating engine, which can also be referred to as an internal combustion engine, is an engine that utilizes one or more pistons in order to convert pressure from the combustion process contained within the piston-cylinder chamber into a rotating motion. It is this rotating motion that drives generator 110.

In this embodiment, reciprocating engine 112 is capable of operating on dual fuels, that is for combusting both natural gas and propane. One such reciprocating engine capable of combusting both fuel types for providing the necessary work to generator 110 is a 25 horsepower internal combustion engine. This engine is designed operate on either natural gas or propane and is fitted with the necessary hardware to switch between fuel types as may be required during operation.

Like a gas turbine combusting natural gas, a reciprocating engine combusting natural gas or propane emits few harmful emissions and is compact in size, lending itself to being portable.

Though reciprocating engine 112 can operate on natural gas or propane, natural gas is the preferred fuel. This natural gas is obtained from a natural gas utility 114 which supplies the natural gas via a fuel line 116. In the event there is a disruption in the natural gas supply, engine 112 can be switched to operate on an alternate fuel supply. The alternate fuel, propane, is stored in a plurality of tanks 118. In the preferred embodiment, three 500 hundred gallon tanks are used. Each 500 gallon tank will provide up to 1000 hours of operation for engine 112 at full load conditions. If the propane fuel is required, valves 120 will open and allow propane from tanks 118 to flow through fuel line 116 to engine 112.

Whether it be by combusting natural gas or propane, reciprocating engine 112, will produce, through generator 110, a first source of AC 122. This AC output is coupled to one side of switch 124. As it can be seen in FIG. 1, switch 124 is shown in a first position 126 in which it is connected to first source of AC output 122 from generator 110. Switch 124 also has a second position 128, such that when the switch is in second position 128, the AC is received from a local utility 130.

Regardless of the position of switch 124, the AC is directed into an AC bus 132. The AC bus is coupled to a means for converting the output from switch 124, including first source of AC 122, into a first source of direct current (DC) 136. In this embodiment, means for converting comprises a plurality of rectifiers 134. As one skilled in the art of electrical generation will know, a rectifier is capable of receiving an AC input and converting that input to produce a DC output. Therefore, for system 100 as presently outlined, rectifiers 134 convert either AC produced by generator 110 or utility 130 to DC. The output of the rectifiers, first source of DC 136, is directed into a DC bus 138. Once in DC bus 138, the DC power is available for consumption by a power distribution unit (PDU) (not shown) for a base transceiver station (BTS) 140. PDU's comprise the electrical equipment for making the necessary connections into the telecommunications cell site equipment.

As previously mentioned, if generator 110 or engine 112 encounter problems, either mechanically or due to fuel supply issues, then system 100 switches to draw AC from local utility 130 by causing switch 124 to move to position 128. The system will stay in this position until engine 112 and generator 110 are brought back online.

If for some reason neither AC source is available to supply power to AC bus 132 for conversion to DC for powering BTS 140, then the control system within system 100 switches to a second source of DC power 146. This second source of DC is provided by a device 142 that consumes hydrogen from a hydrogen source 144. Device 142 preferably comprises at least one fuel cell. As one skilled in the art of fuel cell technology will understand, fuel cells are basically electrochemical energy conversion devices. That is, they utilize hydrogen and oxygen to create electricity. Fuel cells have a proton exchange member (or other equivalent device) to temporarily remove the electron from hydrogen. Later this hydrogen electron is returned when the hydrogen is combined with oxygen. The reaction is non-combustive and environmentally friendly with the only by products being heat and water, as DC electrical power is produced. Furthermore, as long as hydrogen is available to the fuel cell, DC power can be generated. The fuel cell is not like a battery that discharges over time.

Referring again to FIG. 1, fuel cell 142 comprises at least one proton exchange member (not shown) for processing the hydrogen and oxygen. The hydrogen is supplied to fuel cell 142 from a plurality of storage tanks 148. The flow of hydrogen from tanks 148 is controlled by valves 150, which regulate the amount of hydrogen flowing from tanks 148 into manifold 152, and into the hydrogen fuel line, or hydrogen source 144. When hydrogen is required for fuel cell 142, valve 154 is opened allowing the hydrogen to flow from manifold 152 to fuel cell 142.

Though fuel cell 142 used in the preferred embodiment has been shown and described herein as using PEMs, other fuel-cell technologies exist which might be used instead and still fall within the scope of the present invention. One example of a PEM-type fuel cell which is suitable for use with the present invention is the modular, cartridge-based, proton exchange membrane I-1000 power module manufactured by Reli-On, Inc. of Spokane, Wash.

The final major component of system 100 for supplying redundant DC power comprises at least one, and preferably a plurality of capacitors 160 which are used to bridge when switching between first source of DC 136 and second source of DC 146 or should there be an interruption in first source of DC 136. Utilizing these capacitors eliminates the need for an array of batteries, thereby making it more cost efficient and simplifying maintenance issues. As it can be seen from FIG. 1, capacitors 160 are coupled to first source of DC 136 by way of DC bus 138 for maintaining their DC charge. In the event an AC source goes offline, capacitors 160 will maintain DC power in DC bus 138, which is consumed by BTS 140 until another AC source comes online. If no AC source is available, then the DC power for BTS 140 is obtained from second source of DC 146 produced by fuel cell 142. If neither first source of DC 136 (converted from either AC source) nor second source of DC 146 are available, then capacitors 160 will provide the required DC power to BTS 140 until either of the DC sources can be restored. Once any other power source is brought back online, capacitors 160 will be recharged.

The exact duration for which capacitors 160 must operate depends on the system which it is backing-up and that systems specific start-up procedures. For example, when generator 110 goes offline, and switch 124 goes from position 126 to position 128, there will be about a 400 millisecond delay in which no AC is being supplied. If both generator 110 and AC utility 130 are offline, then capacitors 160 will be required to operate for up to 2 minutes until the fuel cell comes online and can generate sufficient DC power. The plurality of capacitors 160 are capable of handling the down time which occurs with either of these situations. Thus, switches between power sources (e.g., going from natural gas to electric utility or from utility to hydrogen) are bridged by the capacitors.

As previously mentioned, power supply system 100 utilizes a control system to switch operation to a device that generates a second source of DC. This control system is also utilized throughout all operations of the power supply system for determining which fuel source to activate and which power source to engage. Although the control system is not shown in FIG. 1, one skilled in the art will understand the types of sensing and measurement devices as well as the programming logic necessary to be able to select between natural gas and propane, between generator 110 and AC utility 130, to activate fuel cells 142, or capacitors 160, just to name a few of the controller functions.

The components of power supply system 100 are configured such as to be mobile and capable of being transportable to a remote site if necessary. A possible embodiment of this mobile arrangement is best shown in FIG. 2 and will be discussed in detail working from the left of the figure to the right. Mounted on mobile platform 202 is cabinet 224, which contains the switch 124 for switching between first AC source from generator 110 and the commercial AC utility 130. The term "platform" will be used throughout this specification and in the claims. It should be noted that this term is not to be defined to specify any specific configuration (like that shown in FIG. 2), but instead should be interpreted to include anything which may serve as a base on which (or about which) system components may be located. The mobile platform in FIG. 2 has a hitch portion 214 which makes it towable behind a motorized vehicle.

Also shown in FIG. 2 is an immobile platform 203 which is used to support trailer 202 as well as other components. In the preferred embodiment, platform 203 is a poured concrete pad. This pad can be poured in anticipation of the arrival of trailer 202 or could alternatively be preexisting at the location.

Adjacent cabinet 224 is cabinet 242 which houses the at least one fuel cell 142 employed to generate the second source of DC. Adjacent to cabinet 242 is cabinet 212 containing the reciprocating engine 112 and generator 110.

The final fixed component on platform 202 is cabinet 260 which contains the capacitors 160 and rectifiers 134.

Located on platform 203 next to trailer 202 are hydrogen storage tanks 148 and propane storage tanks 118. Natural gas is supplied to engine 112 in cabinet 212 by a fuel line independent of platform 202. As it can be noted from the description of the components on platform 202, no fuel source for either reciprocating engine 112 or fuel cell 142 is maintained on platform 202. While it is preferred that the individual site to which the platform will be operating from provides all fuel sources (i.e. natural gas, propane, and hydrogen), this description is not meant to limit the scope of this invention to only this platform arrangement. It should therefore be considered an alternate embodiment of platform 202 to further comprise additional cabinets containing storage tanks for at least hydrogen and propane. It should be understood that the hydrogen and propane tanks may or may not be included as transportable on the trailer. Alternatively, they could be maintained at the site and then installed with the rest of the system when the mobile trailer arrives on site. The utility supply of natural gas will normally exist at the site. Furthermore, it is also possible that components transported on trailer 202 could be removed once at the site for use on the permanent platform 203 or elsewhere on the ground.

Regardless of the specific arrangement, the mobility of the system gives it significant advantages over conventional ones. For example, the entire system could be moved into less populated areas to offer wireless phone service. To do so, the trailer could travel to any spot in which AC power and natural gas connectivity exists, quickly set up, and offer service very quickly. Because the system is preassembled and ready to go, there is no need for project engineers at the site to custom design a power system for the intended facility.

Before discussing the processes of the present invention, it should be understood that it is very important that power is not lost to the BTS—even temporarily. Failures could irrevocably damage customer relations. Customers are becoming increasingly dependent on telecommunications systems to handle important matters, e.g., financial transactions. The system and processes here dramatically reduce the possibilities for failure.

After the system as described above is installed, the steps in FIG. 3 describe one embodiment for system operation.

Referring now to FIG. 3, the system operation method 300 is generally shown for this embodiment. This figure shows how contingency plans are followed in the event that the primary source of AC power is not available. In a first step 302, it is determined whether or not natural gas is available from a natural gas utility. If utility natural gas is available, then the next step 304 is to determine the operational status of the reciprocating engine and generator. If the engine and generator are available, the generator generates a first source of alternating current (AC) at step 306 and this first source of AC is then converted to a first source of direct current (DC) during step 308, by the rectifiers 134, and supplied to an output, such as a base transceiver station (BTS) and to a DC bus to charge the capacitors 160, during steps 310 and 312, respectively.

Returning back to step 302, if the utility natural gas is not available, then it is determined at step 314 if the back-up fuel source, propane, is available. If propane is available for engine 112, then the process returns to step 304 to verify that engine 112 and generator 110 are available. If they are available, the process for generating a first source of AC, converting it to a first source of DC, and supplying it to both the BTS and capacitors is the same as previously outlined. If, however, propane is not available or reciprocating engine and generator are not available, then switch 124 will move from its first position 126 to its second position 128 in step 316, to allow the system to accept AC from a commercial AC utility 130. The determination as to whether or not commercial AC from utility 130 is available is made in step 318. If AC utility 130 is available, then the AC is received into the AC bus as previously discussed, converted into DC by the rectifiers at step 308, and the first source of DC is directed to both the BTS and capacitors at steps 310 and 312, respectively.

If the commercial utility is not available then a determination is made at step 320 regarding the availability of hydrogen. If hydrogen is available, then the determination is made at step 322 regarding the availability of the fuel cell. If the fuel cell is available and there is hydrogen to power the fuel cell, then hydrogen flows to the fuel cell where it is used to generate a second source of DC at step 324, which will be used to power the BTS at step 310. Some of the DC produced will be used to maintain the charge in the capacitors.

If hydrogen is available, but the fuel cell is not, or if hydrogen is not available for supplying a fuel cell, then the determination is made in step 326 as to whether or not the capacitors are available to bridge. If the capacitors are available to bridge this down time, then DC can be temporarily maintained at step 328 and supplied from the capacitors to the BTS at step 310. While capacitors are bridging, in step 328, the process continually loops back through the previous steps as shown in FIG. 3. This will check to see if any of the alternate sources have been restored. Capacitors will continue to bridge until one of the alternate sources comes back online or until the capacitors are fully drained. However, if the capacitors are not available, the process reverts back to step 302 to determine if the utility natural gas has become available.

The most common scenarios for temporary power loss are when power is temporarily lost because of (i) switching between energy generation devices (e.g., generator 110 and fuel cell 142) or (ii) because of start-up delays. For example, in the event of engine and generator failure there will be a short delay from the time generator 110 ceases to function, switch 124 is activated by the control system to change positions (from 126 to 128), and AC is restored to BTS 140 by AC utility 130. And when the system goes to its next backup system, fuel cell 142, there will also be delays which cause a temporary gap in power generation. It takes several seconds to bring the fuel cell online. Most of this downtime is due to the delay in the hydrogen getting to the point at which it is adequately supplying fuel cell 142. All of these scenarios create a time-gap in which there is no power being generated. When this occurs, the "no" answer to query steps 302, 304, 314, 318, and 322, and the "yes" answer in step 326 will lead us to bridging step 328 in which the capacitors temporarily bridge power so that failure is avoided.

Though the processes disclosed above all include a hierarchy in which the backup options are all in the alternative, it is also possible that these options could be used in combination. For example, the present DC power back up hierarchy is disclosed as leading with generator 110, then AC utility 130, then fuel cell 142, each of which are operated separately. It is intended that the scope of this embodiment also include the option of providing DC power from more than one source simultaneously. For example a portion of the required DC power could be provided from the first source of AC, while the remaining DC power requirement could be fulfilled by the fuel cell.

Furthermore, other operational alternatives might exist depending on changes in operational cost. For example, if the cost of natural gas rises above the cost of AC power from the AC utility, an operator would want to change the operational hierarchy and use AC utility power before generating it through the engine and generator, so as to take advantage of the changing economic conditions. Another possibility is for the control system to monitor the amount of AC power or natural gas which has been consumed to date, e.g., for that month. Some utility arrangements result in rate increases when consumption exceeds certain levels. The control system can monitor the time when these levels have been reached, and then switch to an alternative energy source if its operational costs make it more financially attractive.

It will be appreciated by people skilled in the art that the present invention is not limited to what has been particularly shown and described above. Rather, all matter shown in the accompanying drawings or described above is to be interpreted as illustrative and not limiting. Accordingly, the scope of the present invention is defined by the appended claims rather than the foregoing description.

What is claimed is:

1. A power system for use with a mobile power supply, said power system comprising:
    a reciprocating engine producing shaft power;
    at least one fuel source for delivering a fuel to said reciprocating engine;
    a generator coupled to said reciprocating engine for producing an alternating current (AC) electrical output;
    a conversion device coupled to said generator for converting said AC electrical output to a direct current (DC);
    a hydrogen consuming device generating a second source of DC;
    at least one hydrogen source for delivering hydrogen to said hydrogen consuming device; and
    at least one capacitor that bridges between the first source of DC and the second source of DC when switching.

2. The power system of claim 1 wherein said fuel comprises propane.

3. The power system of claim 2 wherein said propane is supplied from a plurality of storage tanks.

4. The power system of claim 1 wherein said fuel comprises natural gas.

5. The power system of claim 4 wherein said natural gas is supplied from utility gas lines.

6. The power system of claim 1 wherein the conversion device comprises at least one rectifier.

7. The power system of claim 1, wherein the hydrogen consuming device comprises at least one fuel cell.

8. The power system of claim 7, wherein the at least one fuel cell is a proton exchange membrane fuel cell (PEMFC).

* * * * *